April 26, 1949.  W. H. GREEN  2,468,597
LIQUID TREATMENT
Filed July 17, 1946
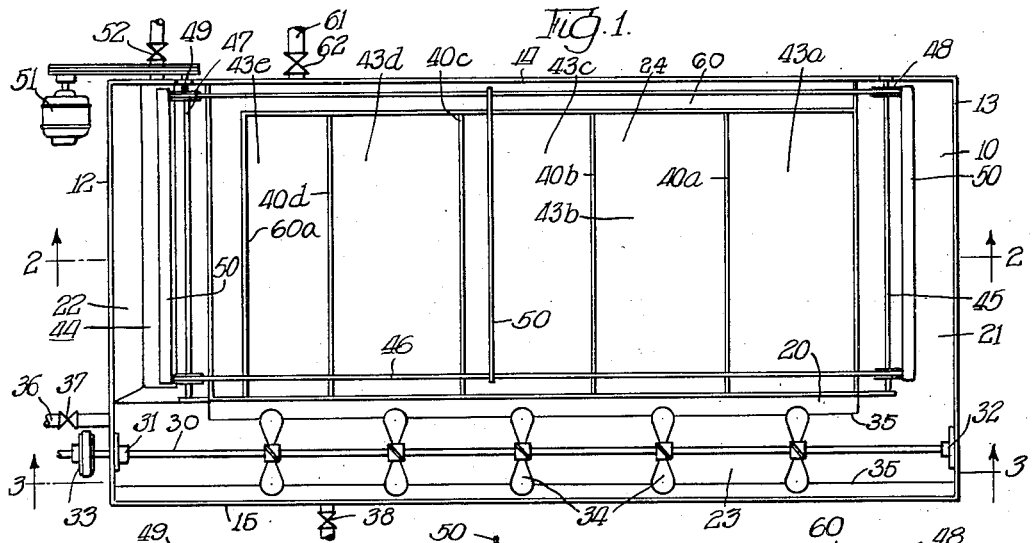
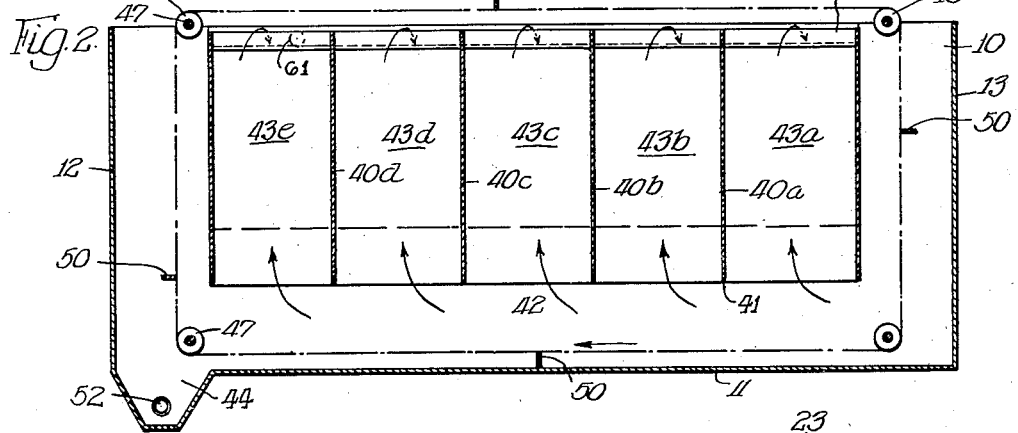
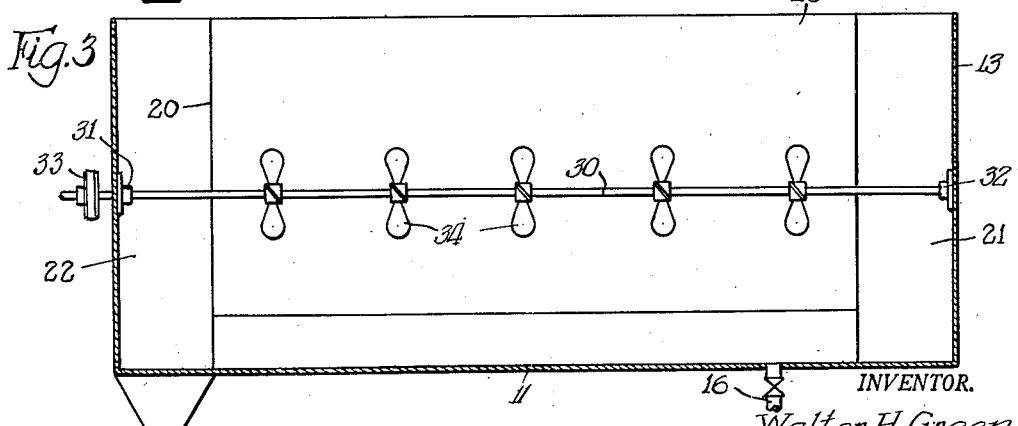
INVENTOR.
Walter H. Green,
BY
Robyn Wilcox
ATTY.

Patented Apr. 26, 1949

2,468,597

UNITED STATES PATENT OFFICE 2,468,597

LIQUID TREATMENT

Walter H. Green, Batavia, Ill., assignor to Infilco Incorporated, Chicago, Ill., a corporation of Delaware Application July 17, 1946, Serial No. 684,136

8 Claims. (Cl. 210—16)

1

This invention relates to the treatment of liquids, such as the clarification of turbid liquids or the softening of hard water.

It is a primary object of the invention to provide improved apparatus and process for clarification of turbid liquids and for softening of hard water.

More specifically the invention relates to the treatment of liquids by what has come to be known in the art as slurry treatment.

It is another object of this invention to improve upon apparatus and process for slurry treatment of liquids.

Another object is to provide an improved apparatus for slurry treatment which permits the use of long shallow tanks.

Another object is to better utilize the space in a slurry type treatment apparatus to provide a large slurry interface with resultant increase in the capacity of the tank.

Other objects of the invention will become apparent from the description and claims which follow.

In slurry treatment of liquids it is usual to maintain in the treating tank a body of slurry comprising liquid undergoing treatment and suspended solids separated and accumulated from previously treated liquid, and to continuously circulate a portion of the slurry. Such circulation generally includes a local circulation within a confined mixing zone and a cyclic flow through the mixing zone, out of the mixing zone into a clarification chamber and thence back into the mixing zone. While the local circulation may have chiefly horizontal extension, it has been usual to provide for the cyclic flow a path with a predominantly vertical component, the liquid leaving the mixing zone at one elevation and reentering it at another elevation. Liquid to be treated and suitable treating reagents are discharged into the circulating slurry, usually at spaced points of the mixing zone, and agitatively mixed with the slurry so that the chemical reactions take place in the presence of the slurry. Separation of clear liquid from the slurry takes place at the upper surface of the body of slurry which forms usually a sharply defined demarcation line between turbid slurry below and clear water above.

In such slurry treatment it has been common to provide for two superposed zones, a lower mixing and circulation zone filled with slurry and an upper quiescent zone filled with clarified liquid. It was also usual to provide for considerable vertical extension of the cyclic flow path. For

2 these and other reasons slurry treatment was generally carried out in tanks which were relatively deep as compared to their width. In such a tank the slurry surface, from which clear liquid separation takes place, is necessarily relatively small. For one thing, the cross sectional area of the tank is relatively small, and due to the vertical extension of the circulation zone only a portion of this small area is available for the slurry interface. Obviously the capacity of the tank is thereby unduly limited. Further, in many installations large rectangular sedimentation tanks could be made available for conversion to slurry type treatment apparatus, but under the prevailing ideas of the prior art referred to above, such long, relatively shallow tanks were believed entirely unsuited for slurry treatment. This means, of course, that in many cases the benefits of slurry treatment could not be obtained, or only with great cost for new equipment.

I have found that the flow pattern usual in prior art slurry treatment, described above, which necessitated deep tanks, is not essential to successful operation of such a process. I now propose to operate in such manner as to make the use of longitudinal shallow tanks possible and at the same time to so construct and operate my apparatus as to obtain a slurry interface of large area with consequent higher capacity of the tank.

To these ends I provide in a tank two laterally adjacent chambers which are in open communication with each other at their ends. One of these chambers is a mixing and agitation chamber extending substantially the full length and height of the tank. In the other chamber, which for convenience may be called a solids separation chamber, a shallow return flow space is provided which extends the full length of the tank adjacent the floor. Above this return flow space, and likewise extending substantially the length of the tank, are a number of quiescent clarification compartments which are in open communication with the return flow space but separated from each other. In each of these compartments the slurry surface is formed which is therefore of considerable extension. By thus juxtaposing rather than superposing the mixing and reaction zone and the clarification zone I am enabled to use quite shallow tanks.

Taken as a process my invention comprises a cyclic flow of slurry through a horizontal flow path extending throughout the full width and length of a treating tank and including an agitation zone and a quiescent flow zone, discharging liquid to be treated and reagent into and mixing with the slurry in the agitation zone, withdrawing streams of slurry from the flow through the quiescent zone upwardly into a plurality of separate, laterally adjacent clarification zones overlying said quiescent flow zone and in open communication therewith, exuding clear water from the slurry interface in the clarification zones and withdrawing it from above the interface, permitting solids to settle from the flow through the quiescent zone and withdrawing them to waste.

My invention will be more fully understood by reference to the detailed description which follows and to the drawings which form a part hereof and wherein like reference characters designate similar elements.

Figure 1 is a plan view of an apparatus according to the invention.

Figure 2 is a vertical cross sectional view of the apparatus taken along line 2—2 of Figure 1.

Figure 3 is a vertical cross sectional view taken along line 3—3 of Figure 1.

The apparatus of my invention may comprise a tank 11 of any desired shape, but preferably and as shown in the drawings, rectangular, having a flat bottom 11 and upright walls, such as end walls 12 and 13, and side walls 14 and 15. A valved drain 16 may be provided to permit emptying the tank for cleaning and repair. I place a vertical partition 20 lengthwise in the tank 10 which may extend from the bottom 11 upwardly to above the normal liquid level in the tank 10. Preferably, and as shown in Figure 1, the partition 20 stops short of the end walls 12 and 13, so as to form passageways or channels 21 and 22 affording communication between the two sides of the partition. Thus the partition 20 forms in the tank 10 two juxtaposed longitudinal chambers, the mixing chamber 23 and the solids separation chamber 24, which are in open communication one with the other at their ends through passageways 21 and 22. Obviously the same effect could be had by a partition extending from end wall to end wall and provided with suitable flow openings in its end portions. It is preferred that the mixing chamber 23 be of considerably less width than the solids separation chamber 24. It may take the form of a long and relatively narrow flow channel of about one-fourth the width of the tank.

Centrally aligned in the mixing chamber 23 is a shaft 30 which may be journaled in suitable bearings 31 and 32 mounted on the end walls 12 and 13, respectively. One end of the shaft 30 extends through end wall 12 to outside the tank. The shaft may be driven by any suitable means, such as pulley 33. A plurality of agitators 34 is rigidly affixed to the shaft 30 and rotatable therewith. While any type of agitators may be used, as for example paddle agitators, preferably the agitators 34 are impellers, or propellors, as they are more suitable for causing the circulation contemplated herein. The mixing chamber 23 may have a trough shaped bottom which may be formed by any suitable means, such as fills 35 along the lower portion of the side wall 15 and of the partition 20. Preferably and as shown in Figure 1, the fill along the side wall 15 will extend the full length of the wall, while the fill along the partition 20 extends only the length of the partition. This provides for smooth passage of liquid into and from the mixing chamber 23. Such a trough shaped bottom is advantageous for the type of agitation I have in mind. An inlet for liquid to be treated 36, which may be provided with a suitable valve 37, discharges into mixing chamber 23 adjacent to the end wall 12. A valved reagent inlet 38 may discharge adjacent to the inlet 36, but preferably, and as shown in Figure 1, it will discharge at a point beyond the first impeller 34, so that the incoming liquid to be treated is thoroughly mixed with slurry before it is mixed with reagent. It will be obvious that the two inlets could be arranged in reverse order so that the reagent would be first mixed with slurry and then the incoming liquid with the mixture of reagent and slurry. The important thing is that the chemical reactions between liquid to be treated and reagent occur in the presence of slurry.

In the solids separation chamber 24 a plurality of partition walls 40a, 40b, 40c, and 40d are provided and extend transversely across the full width of the chamber 24. The walls are spaced above the bottom of the chamber 24, as at 41, and reach upwardly at least to the normal liquid level. This construction provides for a relatively shallow lower return flow space 42 which is free of obstructions, and several compartments 43a, 43b, 43c, 43d and 43e, which are in open communication with, and overlying, the lower flow space 42 but are separated from each other by the walls 40a, 40b, 40c, 40d. While five such compartments 43 are shown, it will be obvious that more or less could be provided and that the number will depend on the length and depth of the tank and the operating conditions. A sufficient number of partition walls should always be provided to still any turbulence of the liquid entering chamber 24, so that conditions in the compartments 43 are favorable for the formation of the slurry interface therein and the escape of clear liquid from the interface.

The bottom of the chamber 24 may be formed with a depression or sump 44 adjacent the end wall 12. A drag scraper 45 of conventional design, comprising chains 46 running over pairs of sprockets 47 and 48, mounted on shafts 49, and carrying scraper blades 50, may be provided to scrape solids settling on the floor 11 to the sump 44. One pair of the sprockets, such as 47, is connected by suitable means to a motor 51. Such scraper devices and their operation are well known in the art and need not be described in detail. Similarly, and as known in the art, by using suitable transmissions the motor driving the scraper 45 can also be used to drive the agitator shaft 30 at a suitable higher speed than the scraper 45. Solids may be withdrawn from the sump 44 through valved solids outlet 52 by any suitable means, not shown.

Liquid rising from the slurry interfaces in the compartments 43 overflows into a launder 60 which may be on either side of chamber 24, but preferably, and as shown, is along the top of the side wall 14. The launder 60 discharges into an effluent conduit 61, provided with a suitable valve 62. Obviously a plurality of transverse launders, such as 60a, could be provided between the individual compartments 43, and discharge into the longitudinal launder 60. Such means are well known in the art; ordinarily, however, the launder 60 will be sufficient.

The operation of my apparatus will be readily understood. As the shaft 30 is rotated, the impellers 34 set up agitation in the mixing chamber 23 and cause a circulation of slurry through the mixing chamber 23, the passageway 21, the return flow space 42, the second passageway 22 back into the mixing chamber 23. Liquid to be treated, entering through inlet 36, is discharged into the slurry in the mixing chamber 23 and first mixed therewith and then with reagent, entering through inlet 38, in the presence of, and admixture with, the slurry. On its way through the mixing and agitation chamber 23 the mixture is vigorously agitated by the several consecutive agitators 34. As the slurry liquid mixture leaves the turbulent mixing chamber 23 and enters the quiescent chamber 24, the transverse partitions 40 in chamber 24 prevent it from spreading in a horizontal flow over the entire depth of the chamber. Instead the liquid is forced to flow in a relatively shallow and wide horizontal stream through the return flow space 42 in the lower portion of the chamber 24. Due to the much greater width of the chamber 24 this flow is relatively slow. As the slurry flows below the compartments 43 a portion of the slurry is displaced upwardly from the horizontal return flow and enters the compartments through their open lower ends. In these compartments sufficient quiescence prevails for the formation of a slurry interface from which an output portion of clear liquid emerges in the usual manner to be withdrawn through launder 60 and outlet conduit 61. The main part of the circulating slurry returns through passageway 22 to chamber 23 to be admixed to further portions of newly entering liquid.

Due to the slow flow in the return flow space 42 heavy solids will settle from the return flow to the bottom of the chamber 24 and be moved by scrapers 45 to the sump 44 to be withdrawn in any suitable manner through sludge conduit 52. The solids are well conditioned for settling by the vigorous agitation in mixing chamber 23 and the repeated circulation through the closed cycle path including the mixing chamber 23, the return flow space 42 and the two passageways 21 and 22. The settling of solids is further aided by the fact that the return flow is quite shallow so that the solids have only a short way to travel before they reach a depositing surface, and further by the fact that they settle from a horizontal flow instead of countercurrently to an upward flow. In the sump 44 further thickening of solids will take place. The quantity of solids to be retained in the slurry can be maintained at the desired value by regulating the withdrawal of solids from the sump 44. The slurry interface, which extends the full length of the partition 20 and the full width of the chamber 24, is so large that it permits a very high rate of throughput as compared with deep tanks of the same volume.

Manifestly many modifications could be suggested by those skilled in the art without departing from the spirit and scope of the invention. Therefore it will be understood, that I do not wish to limit myself to the exact construction of the embodiment of my invention shown and described herein for purposes of illustration and exemplification.

I claim:

1. Liquid treating apparatus comprising a tank having a bottom and a boundary wall, a vertical partition in said tank and dividing the space therein into two laterally adjacent chambers, a flow channel at each end of said partition affording free communication between said chambers, agitating means in one of said chambers, inlet means for liquid to be treated and for reagent discharging into said one chamber, a solids outlet from the lower portion of the other of said chambers, means for applying energy to solids settling on the bottom in said other chamber for moving them to said solids outlet, an overflow adjacent the top of said other chamber, and a partition wall mounted across said other chamber and extending from said vertical partition to the wall of the tank and from the level of the overflow downwardly to an elevation spaced above the bottom of said chamber, and providing in said other chamber a lower flow space free of obstructions and a plurality of laterally adjacent clarifying compartments separated from one another and superposed over said lower flow space, said agitating means being of such capacity and so positioned as to cause, on operation thereof, mixing of incoming liquid and reagent with liquid undergoing treatment in said one chamber and a horizontal circulation through a closed path comprising said one chamber, said flow channels, and said lower flow space.

2. Liquid treating apparatus comprising a tank having a bottom and upright walls, a partition extending longitudinally in said tank from the bottom to substantially the top thereof and forming in said tank two laterally adjacent chambers, a flow channel at each end of said partition affording open communication between said chambers, agitating means in one of said chambers, inlet means for liquid to be treated and for reagent discharging into said one chamber, a solids outlet from the other of said chambers, means in said other chamber for moving solids to said outlet, a launder adjacent the top of said other chamber, and a plurality of transverse partitions in said other chamber, said partitions being spaced above the bottom of the tank and extending upwardly to the elevation of said launder, said agitating means being of such size and so positioned as to cause mixing of incoming liquid and reagents and a circulation of liquid through said one chamber, said channels, the other chamber, and back into the first chamber.

3. Liquid treating apparatus comprising a tank having a bottom and upright walls, a vertical partition extending longitudinally in said tank and forming therein a mixing and agitation chamber on one side of said partition and a laterally adjacent chamber on the other side of said partition, said partition extending the full height of said tank but only part way of its length, whereby an open passageway is formed around each end of said partition affording communication between said chambers, inlet means for liquid to be treated and for reagent discharging into said mixing and agitation chamber, a treated liquid overflow from said laterally adjacent chamber, a transverse partition in said laterally adjacent chamber extending the full width thereof and from the level of said overflow down to an elevation spaced above the bottom of said tank, and providing in said laterally adjacent chamber a lower return flow space which is free from obstructions and a plurality of upper clarification compartments, power driven agitating means in said mixing and agitation chamber, said agitating means being so constructed and arranged as to cause, on operation thereof, mixing of incoming liquid and reagent and a horizontal circulation of liquid in said tank in a cyclic path comprising said mixing and agitation chamber, one of said passageways, said return flow space and the other of said passageways, a solids outlet from the lower portion of said laterally adjacent chamber, and means for moving solids deposited in said return flow space to said solids outlet.

4. A slurry type liquid treating process comprising the steps of maintaining in a tank a body of slurry containing liquid undergoing treatment and suspended solids separated and accumulated from previously treated liquid, applying mechanical impelling energy to said slurry to establish a horizontal circulation of slurry throughout the tank in a path including a turbulent agitation zone and a laterally adjacent quiescent return flow zone, discharging liquid to be treated and reagent into, and mixing it with, the slurry in said agitation zone, withdrawing streams of slurry from the horizontal flow through the return flow zone upwardly into a plurality of separate laterally adjacent clarification zones overlying said return flow zone and in open communication therewith, exuding clarified liquid from the slurry surface in said clarification zones, withdrawing clarified liquid from the upper portion of said clarification zones, and withdrawing settled solids from the lower portion of said return flow zone.

5. Liquid treating apparatus comprising a tank, a vertical partition mounted in said tank and extending the full height thereof but only part of the length and forming two laterally adjacent chambers in said tank communicating at their ends around said partition, one of said chambers being a mixing and agitation chamber, transverse partitions in the other of said chambers extending the full width thereof but only part of the depth and forming in said chamber a lower unobstructed flow space and a plurality of laterally adjacent compartments separated from each other by said transverse partitions and overlying, and in open communication with, said lower flow space, inlet means for liquid to be treated into said mixing and agitation chamber, inlet means for introducing reagent to the liquid entering to be treated, mechanical agitating means in said agitating chamber and so constructed and arranged as to cause, on operation thereof, mixing of incoming liquid and reagent with liquid undergoing treatment and a horizontal circulation of liquid in said tank through a path embracing said mixing and agitation chamber and said lower flow space, a solids outlet from the lower flow space, means for moving solids along the bottom of said flow space to said outlet, and a launder adjacent the top of said compartments.

6. Liquid treating apparatus comprising a rectangular tank having a bottom and side and end walls, an overflow from an upper portion of said tank, a vertical partition mounted lengthwise in said tank in such manner as to form in said tank two laterally adjacent chambers, one of which is relatively narrow and the other relatively wide, said overflow leading from said wide chamber, said partition extending from the bottom of said tank to above the level of said overflow and stopping short of both end walls, whereby said chambers are in free communication one with the other around the ends of said partition, a horizontal power driven shaft centrally aligned in the narrow chamber and extending to the full length thereof, a plurality of impellers affixed to said shaft, an inlet for liquid to be treated and an inlet for reagent discharging into said narrow chamber in proximity to the first impeller in the direction of flow, a plurality of transverse partition walls in the wide chamber and extending the full width thereof and from the level of said overflow to an elevation spaced above the bottom of said chamber, a sump at one end of said wide chamber, a scraper mechanism adapted to scrape solids from the bottom of said wide chamber into said sump, means for withdrawing solids from said sump, and means for driving said scraper mechanism.

7. Liquid treating apparatus comprising a rectangular tank, a longitudinal partition in said tank extending the full height of said tank, a flow channel at each end of said partition establishing free communication between the spaces on the two sides of the partition, agitating means in the space on one side of the partition, said agitating means being so constructed and positioned as to cause a horizontal circulation of liquid in said tank around said longitudinal partition, inlet means for liquid to be treated and for reagent discharging adjacent said agitating means, a treated liquid outlet from the upper portion of the space on the other side of said longitudinal partition, a transverse partition in said other space and extending the full width of said space and from the elevation of said treated liquid outlet only partway the depth of said tank, a solids outlet from the lower portion of said other space, and means for moving solids deposited in said other space to said solids outlet.

8. A liquid treating process comprising the steps of maintaining in a tank a body of liquid undergoing treatment and containing suspended solids retained from previously treated liquid, establishing in said body of liquid a mixing zone and a laterally adjacent solids separation zone comprised of a lower return flow zone and a plurality of separated quiescent zones superposed over, and in open communication with the return flow zone, discharging liquid to be treated and reagent into the liquid in said mixing zone, applying agitating and impelling energy sufficient to mix said liquid to be treated and reagent in and with liquid in said mixing zone and to maintain a continuous circulation of liquid through a path embracing said mixing zone and said return flow zone, displacing liquid from said return flow zone upwardly into said quiescent zones, withdrawing treated liquid from the upper portions of said quiescent zones, and withdrawing solids from said return flow zone.

WALTER H. GREEN.

REFERENCES CITED

The following references are of record in the file of this patent:

UNITED STATES PATENTS

| Number | Name | Date |
|---|---|---|
| 1,715,438 | Travers | June 4, 1929 |
| 2,089,160 | Darby | Aug. 3, 1937 |
| 2,118,157 | Camp | May 24, 1938 |
| 2,419,004 | Bieker et al. | Apr. 15, 1947 |